United States Patent [19]

Hilliard

[11] 4,115,356

[45] Sep. 19, 1978

[54] SELF ADHERING ROOM TEMPERATURE VULCANIZABLE SILICONE ELASTOMERS

[75] Inventor: John R. Hilliard, Midland, Mich.

[73] Assignee: Dow Corning Corporation, Midland, Mich.

[21] Appl. No.: 816,787

[22] Filed: Jul. 18, 1977

[51] Int. Cl.$^2$ ............................................. C08L 83/04
[52] U.S. Cl. ................................ 528/18; 260/37 SB; 428/429; 428/447; 528/41
[58] Field of Search ...................... 260/37 SB, 465 G; 428/429

[56] References Cited

U.S. PATENT DOCUMENTS

| 3,427,270 | 2/1969 | Northrup | 260/46.5 G X |
| 3,485,780 | 12/1969 | Sterman et al. | 260/37 SB X |
| 3,825,618 | 7/1974 | Pepe | 260/46.5 G X |
| 4,033,924 | 7/1977 | Mine et al. | 260/37 SB |

Primary Examiner—Lewis T. Jacobs
Attorney, Agent, or Firm—Roger H. Borrousch

[57] ABSTRACT

The addition of an epoxytrialkoxysilane such as glycidoxypropyltrimethoxysilane to room temperature vulcanizable silicone elastomer compositions which vulcanize through the reaction of moisture with silicon-bonded acetoxy functionality gives improved adhesion when cured in contact with substrates such as glass and aluminum without the use of primers.

16 Claims, No Drawings

SELF ADHERING ROOM TEMPERATURE VULCANIZABLE SILICONE ELASTOMERS

BACKGROUND OF THE INVENTION

1. Field of the Invention

This invention relates to room temperature vulcanizable elastomers compositions and methods for preparing such compositions.

2. Description of the Prior Art

Room temperature vulcanizable silicone elastomer compositions curable through a number of mechanisms are known in the art. Some room temperature vulcanizable silicone elastomers cure by exposure to moisture through hydrolyzable functionality. The silicone elastomer compositions of this invention contain acetoxy functionality to allow cure at room temperature. Such compositions are described in U.S. Pat. Nos. 3,035,016; 3,077,465; and 3,274,145.

While prior art compositions have been commercially successful, their adhesion to certain types of substrates is a continuing problem.

One approach to provide the necessary adhesion of elastomeric materials to all types of substrates has been the development of priming systems. Such priming systems are undesirable in that they require additional steps and additional time in the process of bonding surfaces together.

Plueddemann in U.S. Pat. No. 3,455,877 describes organosilicon epoxides useful in the preparation of coating resins, laminates, and as intermediates in the preparation of other organosilicon materials. The Plueddemann patent describes the epoxytrialkoxysilanes used in this invention.

Nitzsche et al. in U.S. Pat. No. 3,131,161 have disclosed the use of epoxide compositions in high viscosity siloxane polymer formulations to produce improved tear properties. The silicone rubber stocks are cured with an organic peroxide and heat or with an alkylorthosilicate, alkylpolysilicate, or alkylhydrogensiloxane and a monocarboxylic metallic acid salt in the presence of moisture.

U.S. Pat. No. 3,076,726 by Ault et al. uses an epoxytriacetoxysilane of a type described in the above U.S. Pat. No. 3,455,877 with a methylpolysiloxane to obtain improved rubbery coatings which are particularly useful for purposes of release.

In spite of the advances made in obtaining bonding of elastomeric materials to substrates, problems still remain. The adhesion of the previous acetoxy containing room temperature vulcanizable silicone elastomers to glass and aluminum surfaces, particularly on long exposure to moisture, has not been satisfactory.

SUMMARY OF THE INVENTION

The addition of epoxytrialkoxysilanes to room temperature vulcanizable silicone elastomer compositions containing organotriacetoxysilane improves the adhesion of the cured elastomer to glass and aluminum surfaces. The improved adhesion is particularly evident if the adhesion is determined after substantial exposure of the bonded surfaces to water.

DESCRIPTION OF THE INVENTION

This invention relates to a composition storage stable in the absence of moisture which vulcanizes at room temperature on exposure to moisture comprising a product resulting from mixing (A) 100 parts by weight of polydiorganosiloxane consisting essentially of repeating units of the formula $R_2SiO$ having a viscosity of at least 0.10 Pa.s at 25° C in which each R represents a monovalent hydrocarbon or halogenated monovalent hydrocarbon radical of from 1 to 18 inclusive carbon atoms, said siloxane having an average of from 1.5 to about 2 silicon-bonded hydroxyl radicals per molecule, (B) from 0.5 to 15 parts of an organotriacetoxysilane of the formula

in which R' represents a monovalent radical selected from the group consisting of lower alkyl, fluorinated lower alkyl, alkenyl, and aryl radicals, there being at least one organotriacetoxysilane molecule per hydroxyl radical of polyorganosiloxane (A), and (C) from 0.1 to 2.5 parts of a compound of the formula

in which R" is a radical attached to silicon by a carbon to silicon bond and selected from the group consisting of divalent hydrocarbon radicals to from 1 to 10 carbon atoms and divalent radicals of less than 10 carbon atoms which are composed of carbon, hydrogen, and oxygen atoms, the last being in the form of ether linkages, not as an atom of a ring, and R'" is selected from the group consisting of aliphatic hydrocarbon radicals of less than 5 carbon atoms.

Silicone elastomer compositions with silicon-bonded acetoxy functionality are well known in the art and are available commercially. The particular type of room temperature vulcanizable silicone elastomer compositions useful in this invention is prepared from polydiorganosiloxanes having hydroxyl groups, and organotriacetoxysilanes. Bruner in U.S. Pat. Nos. 3,035,016 and 3,077,465 describes acyloxy endblocked polydiorganosiloxanes capable of curing at room temperature to rubbery materials. The compositions of the Bruner patents are produced by reacting acyloxy silanes with hydroxylated siloxanes. The details of the above compositions can be obtained from U.S. Pat. Nos. 3,035,016 and 3,077,465 which are hereby incorporated by reference to illustrate acetoxy silicone elastomeric compositions and their preparation.

The polydiorganosiloxanes have organic radicals of from 1 to 18 inclusive carbon atoms selected from monovalent hydrocarbon radicals and halogenated monovalent hydrocarbon radicals, preferable at least 50 percent of the organic radicals are methyl radicals. The most preferred organic radicals are methyl, ethyl, vinyl, phenyl, and 3,3,3-trifluoropropyl. The viscosity of the polydiorganosiloxane can range from 0.10 Pa.s at 25° C up to non-flowing benzene soluable gums. The preferred range of viscosity of the polydiorganosiloxane to yield a paste consistency of the room temperature vulcanizable silicone elastomer composition is 0.10 to 50 Pa.s at 25° C with the most preferred range being 5 to 20 Pa.s at 25° C. For the purpose of this invention, the polydiorganosiloxane has and average of from 1.5 to about 2 hydroxyl groups per molecule. The hydroxylated siloxanes of the formula

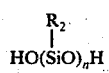

would have 2 hydroxyl groups per molecule. The essentially diorganopolysiloxane described by Dupree in U.S. Pat. No. 3,274,145, which is herein incorporated by reference to describe the production of polydiorganosiloxane, describes molecules having from 1.5 to about 2 hydroxyl radicals per molecule. The terminal radicals of the Dupree polydiorganosiloxane are in part silicon-bonded hydroxyl radicals and in part triorganosiloxane radicals, more than half of the said terminal radicals being silicon-bonded hydroxyl radicals. The rubberiness, or modulus, of the cured silicone elastomer is a function of the amount of triorganosiloxane endblocking of the polydiorganosiloxane for any given viscosity.

The organotriacetoxysilanes are also well known in the art. The organic radical R', on the silicon atom can be a lower alkyl such as methyl, ethyl, butyl, and tertiarybutyl, a fluorinated lower alkyl such as 3,3,3-trifluoropropyl, alkenyl radical such as vinyl, allyl, or hexenyl, an aryl such as phenyl, tolyl, xylyl, and an aralkyl such as benzyl or β-phenylethyl. The most preferred organic radicals are methyl, ethyl, vinyl, phenyl, and 3,3,3-trifluoropropyl radicals. The preferred organotriacetoxysilanes are methyltriacetoxysilane and ethyltriacetoxysilane and mixtures thereof. The organotriacetoxysilanes are used in amounts from 0.5 to 15 parts based on 100 parts of polydiorganosiloxane with the preferred amount being from 3 to 10 parts.

The improvement of this invention is the use of a compound of the formula

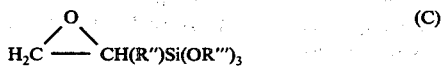

in the silicone elastomer compositions which improves adhesion of the cured silicone elastomer composition to substrates. R" is a radical attached to silicon by a carbon to silicon bond and selected from the group consisting of divalent hydrocarbon radicals of less than 10 carbon atoms or divalent radicals of less than 10 carbon atoms which are composed of carbon, hydrogen, and oxygen atoms, the last being in the form of ether linkages. Examples of R" include a divalent hydrocarbon radical such as methylene, ethylene, decylene, phenylene, cyclohexylene, cyclopentylene, methylcyclohexylene, 2-ethylbutylene, and allylene, and an ether radical such as

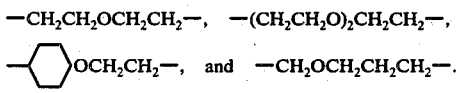

R''' can be any aliphatic hydrocarbon radical of less than 5 carbon atoms, such as methyl, ethyl, isopropyl, butyl, vinyl, or allyl. Epoxy compounds in which R" has at least 2 carbon atoms are best prepared by adding unsaturated epoxy compounds to a silane of the formula HSi(OR''')₃ in the presence of a suitable catalyst such as chloroplatinic acid. Further description may be found in U.S. Pat. No. 3,455,877 hereby incorporated by reference for the preparation of these compounds. Many of these compounds are commerically available. The preferred compound is glycidoxypropyltrimethoxysilane.

Compound (C), is used in an amount of from 0.1 to 2.5 parts based on 100 parts of polydiorganosiloxane with the preferred amount from 0.25 to 2.5 parts. The most preferred amount is from 0.5 to 2.0 parts.

The compositions of this invention are formed by mixing polydiorganosiloxane (A), organotriacetoxysilane (B) and the compound (C) in the substantial absence of moisture. For practical operation, it is best to use more than one mole of acetoxy silane per silicon-bonded hydroxyl. Excess acetoxy silane acts as a scavenger for any incidental moisture that may be present in the preparation and also provides protection on storage of the final composition. This mixing is carried out in the substantial absence of moisture because moisture will cause the ingredients to prematurally vulcanize. After mixing, the composition is storage stable as long as moisture is prevented from contacting the composition. The properties of the composition such as viscosity remain at essentially the same level for as long as one year after packaging.

If the composition is vulcanized by allowing access to moisture shortly after mixing, the vulcanized silicone elastomer will exhibit a certain physical properties profile such as is illustrated in the examples. If the composition is stored in the absence of moisture for as long as one year, for instance, and then vulcanized by allowing access to moisture, the vulcanized silicone elastomer will exhibit approximately the same physical property profile as that produced by the unaged composition.

Compositions of this invention can be used without further modification in a sealing, caulking, bonding or coating application by merely placing the composition in the desired place and permitting it to cure on exposure to the moisture in the atmosphere. The composition of this invention is placed on the surface to which it is to be bonded, without any particular preparation or priming of the substrate surface other than a simple cleaning. When exposed to moisture in the air, the composition cures to an elastomer which is bonded to the substrate upon which it was placed.

The degree of bonding of a composition to a substrate depends upon the exact formulation of the room temperature vulcanizable silicone elastomer composition used and the type of substrate. The compositions of this invention bond particularly well to glass and aluminum surfaces without any treatment of the surface other than cleaning. Prior art acetoxy functional materials needed a primer in order to maintain a firm adhesive bond to many types of surfaces including glass and aluminum. Some materials would provide an initial bond but lose adhesion on long term exposure to moisture or on long term immersion in water. The compositions of this invention maintain a firm adhesive bond to aluminum and glass surfaces even after immersion in water.

When there is a satisfactory bond between a substrate surface such as glass and the bonding material, a mechanical stress on the bond area will cause the bonding material to rupture, leaving part of the bonding material still adhered to the substrate. This type of failure is referred to as cohesive failure. If the bond is not satisfactory, the mechanical stress will cause the bonding material to loose adhesion to the substrate and there will be no bonding material adhered to the substrate. This type of failure is referred to as adhesive failure.

Materials intended for use as adhesives, sealants, caulking compounds, coatings, and such may be evaluated as to their bond to substrates by applying the material to the substrate to be tested, curing the material and then peeling the material from the substrate. The force required to remove the material from the substrate and the type of adhesion failure form a basis for judging the usefulness of the material. Such tests may be performed on samples after they are cured and also after various types of exposures such as heating, immersion in liquids, and such to simulate the possible effects of expected use conditions. For instance, boiling the sample in water simulates the effect of long term immersion in water at room temperature.

The storage stable composition of this invention provides bonding without priming if used shortly after mixing or if used after storage in the absence of moisture, for longer periods, up to a year for instance.

It is often desirable to accelerate the cure of the compositions of this invention by the use of catalyst such as the carboxylic acid salt of metal ranging from lead to manganese inclusive in the electromotive series of metals as disclosed in U.S. Pat. No. 3,077,465 by Bruner. The preferred curing catalyst is a diorganotincarboxylate with the most preferred catalyst being dibutyltin diacetate. The amount of catalyst is from 0.001 to 10 parts by weight based on the weight of polydiorganosiloxane with the preferred amount from 0.06 to 1.0 part.

If desired, various other ingredients may be present such as fillers, flame retardants, stabilizing agents and plasticizers such as siloxane fluids, and pigments. Illustrative of the many fillers which may be employed are the reinforcing silica fillers, both treated and untreated including fume silica, silica aerogel, silica xerogel and precipitated silicas. Examples of extending fillers include crushed quartz, aluminum oxide, magesium oxide, zinc oxide, talc, diatomaceous earth, iron oxide, clays, titanium dioxide, zirconia, sand, carbon black, and graphite among others. Fillers are used in amounts from 10 to 100 parts depending on the type of filler used. A preferred amount of fume silica is from 5 to 20 parts.

Where the compositions of the present invention contain components other than polydiorganosiloxane (A), organotriacetoxysilane (B), and adhesion additive compound (C), for ease of manufacturing, it is often convenient to form a mixture of the polydiorganosiloxane with the components other than (B) and (C), to then remove any moisture by heating or by maintaining the mixture under vacuum, and thereafter adding components (B) and (C), while protecting the composition from moisture.

The room temperature vulcanizable silicone elastomer compositions of this invention are particularly useful for bonding and sealing applications where the bond must withstand the effects of exposure to water for long periods. These materials are especially useful in bonding aluminum and glass which will be exposed to water and which must maintain a bond when so exposed.

The following examples are illustrative only and should not be construed as limiting the present invention which is properly delineated in the claims. All parts are parts by weight.

EXAMPLE 1

A mixture of the following ingredients was made in a mixer in the absence of moisture.

100 parts polydimethylsiloxane fluid with a viscosity of approximately $1.25 \times 10^{-2}$ meter$^2$ per second (m$^2$/s) at 25° C endblocked with approximately 20% trimethylsiloxy radicals and 80% hydroxyl radicals, 10 parts fumed silica with a surface area of 200 square meters per gram, 5.6 parts of mixture of 50 weight percent methyltriacetoxysilane and 50 weight percent ethyltriacetoxysilane with 0.1 parts of dibutyltindiacetate based on 100 parts of silane mixture.

Portions of 100 g each of the above mixture were then mixed with varying amounts of glycidoxypropyltrimethoxysilane as shown in Table I and packaged without exposure to moisture. These mixtures were then used to prepare samples for evaluating their adhesive properties.

Samples for measuring adhesive properties were prepared by carefully cleaning the glass or aluminum substrate with trichloroethylene, then with acetone. A 1.6 mm thick layer of the mixture was applied to the substrate using a draw-down technique and shims of the proper thickness. An aluminum screen was imbedded in the surface of the mixture and another 1.6 mm thick layer was applied over the screen immediately. The adhesion sample was then cured for 7 days at 25° C and 50% relative humidity.

A strip 25.4 mm wide was cut the length of the cured sample through the cured composition to the substrate. The end of the flexible cured composition was carefully cut loose from the substrate at the substrate surface for a distance sufficient to attach a tensile testing machine to the end when the flexible cured composition and reinforcing layer was bent back 180°.

The cured composition layer was then separated from the substrate at a rate of 51 mm per minute. During the pull, the flexible layer was cut down to the substrate surface at least three times to assure the maximum strain at the interface between the cured composition and the substrate. The average of the peak loads after undercutting to the substrate surface were reported as the peel strength. The appearance of the peeled surface of the substrate was observed to give an estimate of the amount of cohesive failure between the substrate and the adhesive.

The adhesion values obtained are shown in Table I along with the concentration of glycidoxypropyltrimethoxysilane used in each sample.

Similar samples were prepared, cured and then immersed in boiling water for the indicated time to determine if the bond would withstand the effects of water immersion. After the water immersion the samples were cooled and tested as described above, noting particularly if the separation of the cured composition from the substrate was a cohesive or adhesive failure. An adhesive failure is failure between the cured composition and the substrate. A cohesive failure is failure within the cured composition, leaving an amount of cured composition adhered to the substrate.

TABLE I

180° Peel Tests

| | Unprimed Glass | | | | Unprimed Aluminum | | | |
|---|---|---|---|---|---|---|---|---|
| | Initial | | Hour Boil | | Initial | | 2 Hour Boil | |
| X, gms | kN/m | failure* | kN/m | failure | kN/m | failure | kN/m | failure |
| 0 | 1.6 | 100 | 0.35 | 0 | 0.43 | 0 | 0.17 | 0 |
| 0.5 | 1.4 | 100 | 2.26 | 0 | 1.5 | 55 | 0.44 | 0 |
| 1.0 | 1.6 | 100 | 0.37 | 0 | 1.7 | 100 | 0.37 | 0 |
| 2.0 | 2.5 | 100 | 4.5 | 100 | 4.7 | 100 | 3.1 | 100 |
| 3.0 | Incomplete cure | | | | | | | |

*percent of cohesive type failure
1 kilonewton per meter, kN/m = 5.72 pounds per inch, ppi

EXAMPLE 2

A mixture was made in the absence of moisture of 140 parts of a polydimethylsiloxane fluid endblocked as described in Example 1, 4 parts of a hydroxyl endblocked phenylmethylpolysiloxane fluid having about 4 weight percent hydroxyl radicals, 14 parts of a fumed silica filler with a surface area of 250 square meters per gram, 1.2 parts of titanium dioxide pigment, and 9.6 parts of a mixture of 50 weight percent of methyltriacetoxysilane and 50 weight percent of ethyltriacetoxysilane with 0.5 parts of dibutyltindiacetate based on 100 parts of silane mixture.

To a portion of the above mixture was added 2 parts of glycidoxypropyltrimethoxysilane based on 100 parts of the mixture. The adhesion tests described in Example 1 were then run with the following results.

| Percent additive | None | 2 |
|---|---|---|
| 180° peel strength, kN/m | | |
| unprimed glass | 1.7 | 1.8 |
| unprimed aluminum | 0.52 | 1.6 |
| Adhesion to unprimed glass after 4 hours in boiling water | | |
| percent cohesive failure | O | 100 |

EXAMPLE 3

A series of mixtures were made to evaluate the effect of the amount of glycidoxypropyltrimethoxysilane used upon the physical properties and adhesion of the mixtures.

Mixtures were made in the absence of moisture of 100 parts of polydimethylsiloxane fluid as described in Example 1, 10 parts of fumed silica with a surface area of approximately 250 m²g, 6.9 parts of the triacetoxy silane mixture described in Example 1, the parts of glycidoxypropyltrimethoxysilane as shown in Table II.

Samples were prepared and tested as described in Example 1. Slabs for physical property testing were prepared by carefully spreading the mixture onto a smooth polypropylene sheet with 6.4 mm thick spacer on each side A draw-down bar was passed over the surface while resting on the spacers to give a uniform thickness. After 72 hours of total cure at 25° C and 50% relative humidity the physical properties were measured. The durometer was measured in accordance with ASTM D2240 procedure on the Shore A scale. Tensile strength and Elongation were measured in accordance with ASTM D412 procedures using die C.

The rate of cure was evaluated by a skin over time test. Each material was carefully spread in a 3 mm thick strip and exposed to an atmosphere at 25° C and 50% relative humidity. A freshly cleaned fingertip was then lightly applied to the surface and slowly drawn away. This step was repeated and then the surface tested again each minute. A new surface was touched at each contact. The skin over time is the time where the sample no longer adheres to the fingertip. Each of the compositions defined in Table II had a skin over time of 7 minutes. Results are shown in Table II.

TABLE II

| Glycidoxy- | | | | 180° Peel Strength | | Adhesion After 4 |
|---|---|---|---|---|---|---|
| propyl-tri-methoxy-silane | Duro-meter | Ten-sile | Elong-ation | Un-primed Glass | Un-primed Alum-inum | Hours In Boiling Water |
| Parts | Shore A | MPa | % | kN/m | kN/m | Unprimed Glass |
| 0 | 28 | 1.96 | 410 | 3.1* | 3.3 | fail[1] |
| 0.25 | 27 | 2.05 | 433 | 3.5 | 3.5 | fail |
| 0.5 | 28 | 2.31 | 465 | 3.7 | 3.3 | pass[2] |
| 1.0 | 29 | 1.56 | 350 | 4.0 | 2.8 | pass |
| 1.5 | 27 | 1.47 | 360 | 2.4 | 2.6 | pass |

*50% cohesive failure. All others 100% cohesive failure.
[1]fail means-less than 80% cohesive failure of the bond.
[2]pass means greater than 80% cohesive failure of the bond.

That which is claimed is:

1. A composition storage stable in the absence of moisture which vulcanizes at room temperature on exposure to moisture comprising a product resulting from mixing (A) 100 parts by weight of polydiorganosiloxane consisting essentially of repeating units of the formula $R_2SiO$ having a viscosity of at least 0.10 Pa.s at 25° C in which each R represents a monovalent hydrocarbon or halogenated monovalent hydrocarbon radical of from 1 to 18 inclusive carbon atoms, said siloxane having an average of from 1.5 to about 2 silicon-bonded hydroxyl radicals per molecule, (B) from 0.5 to 15 parts of an organotriacetoxysilane of the formula

in which R' represents a monovalent radical selected from the group consisting of lower alkyl, fluorinated lower alkyl, alkenyl, and aryl radicals, there being at least one organotriacetoxysilane molecule per hydroxyl radical of polyorganosiloxane (A), and (C) from 0.1 to 2.5 parts of a compound of the formula

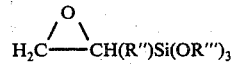

in which R″ is a radical attached to silicon by a carbon to silicon bond and selected from the group consisting of divalent hydrocarbon radicals of from 1 to 10 carbon atoms and divalent radicals of less than 10 carbon atoms which are composed of carbon, hydrogen, and oxygen atoms, the last being in the form of ether linkages, not as an atom of a ring, and R''' is selected from the group consisting of aliphatic hydrocarbon radicals of less than 5 carbon atoms.

2. The composition in accordance with claim 1 in which a filler is present.

3. The composition in accordance with claim 1 in which a curing catalyst for the product is present.

4. The composition in accordance with claim 3 in which a filler is present.

5. The composition in accordance with claim 1 in which (C) is from 0.25 to 2.5 parts of glycidoxypropyltrimethoxysilane.

6. The composition in accordance with claim 5 in which R and R' are selected from the group consisting of methyl, ehtyl, vinyl, phenyl, and 3,3,3-trifluoropropyl radicals with at least 50 percent being methyl radicals.

7. The composition in accordance with claim 6 in which (B) is from 3 to 10 parts of an organotriacetoxysilane.

8. The composition in accordance with claim 7 in which a filler and a curing catalyst for the product are present.

9. The composition in accordance with claim 8 in which the curing catalyst is a diorganotindicarboxylate.

10. The composition in accordance with claim 9 in which the curing catalyst is dibutyltindiacetate.

11. The composition in accordance with claim 10 in which the dibutyltindiacetate is present in an amount of from 0.06 to 1 parts, the filler is a fume silica present in an amount of from 5 to 20 parts, the organotriacetoxysilane is a mixture of methyltriacetoxysilane and ethyltriacetoxysilane, the glycidoxypropyltrimethoxysilane is present in an amount of from 0.5 to 2.0 parts, and the polydiorganosiloxane is polydimethylsiloxane with from 1.5 to 2 hydroxyl radicals per molecule, the polydimethylsiloxane having a viscosity of 5 to 20 Pa.s at 25° C.

12. In a method of preparing a composition storage stable in the absence of moisture which vulcanizes at room temperature on exposure to moisture comprising mixing in the absence of moisture hydroxylated polydiorganosiloxane and organotriacyloxysilane wherein the improvement comprises mixing (A) 100 parts by weight polydiorganosiloxane consisting essentially of repeating units of the formula $R_2SiO$ having a viscosity of at least 0.10 Pa.s at 25° C in which each R represents a monovalent hydrocarbon or halogenated monovalent hydrocarbon radical of from 1 to 18 inclusive carbon atoms, said siloxane having an average of from 1.5 to about 2 silicon-bonded hydroxyl radicals per molecule, (B) from 0.5 to 15 parts of an organotriacetoxysilane of the formula

in which R' represents a monovalent radical selected from the group consisting of lower alkyl, fluorinated lower alkyl, alkenyl, and aryl radicals, there being at least one organotriacetoxysilane molecule per hydroxyl radical of polyorganosiloxane (A), and (C) from 0.1 to 2.5 parts of a compound of the formula

in which R'' is a radical attached to silicon by a carbon to silicon bond and selected from the group consisting of divalent hydrocarbon radicals of from 1 to 10 carbon atoms and divalent radicals of less than 10 carbon atoms which are composed of carbon, hydrogen, and oxygen atoms, the last being in the form of ether linkages, not as an atom of a ring, and R''' is selected from the group consisting of aliphatic hydrocarbon radicals of less than 5 carbon atoms to yield a product.

13. The method of claim 12 in which a filler and a curing catalyst for the product is present.

14. The method of claim 13 in which the catalyst is a diorganotindicarboxylate.

15. The method of claim 14 in which (C) is from 0.25 to 2.5 parts of glycidoxypropyltrimethoxysilane.

16. The method of claim 12 wherein the resulting composition is placed in contact with a substrate, is exposed to moisture and a vulcanized silicone elastomer is obtained with unprimed adhesion to the substrate.

* * * * *

UNITED STATES PATENT AND TRADEMARK OFFICE
CERTIFICATE OF CORRECTION

PATENT NO. : 4,115,356
DATED : September 19, 1978
INVENTOR(S) : John R. Hilliard It is certified that error appears in the above—identified patent and that said Letters Patent is hereby corrected as shown below:

Column 7, Table I, the column entitled "Hour Boil"

should read -- 2 Hour Boil --.

Column 7, Table I, "2.26" should read -- 0.26 --.

Signed and Sealed this

Eighth Day of June 1982

[SEAL]

Attest:

*Attesting Officer*

GERALD J. MOSSINGHOFF
*Commissioner of Patents and Trademarks*